(12) United States Patent
Wickersham et al.

(10) Patent No.: US 11,753,179 B2
(45) Date of Patent: Sep. 12, 2023

(54) AIRCRAFT ENGINES WITH A FUEL CELL

(71) Applicant: General Electric Company, Schenectady, NY (US)

(72) Inventors: Andrew Wickersham, Liberty Township, OH (US); Richard Hart, Broadalbin, NY (US)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 17/070,460

(22) Filed: Oct. 14, 2020

(65) Prior Publication Data

US 2022/0111974 A1 Apr. 14, 2022

(51) Int. Cl.
| | |
|---|---|
| *B64D 41/00* | (2006.01) |
| *B64D 27/16* | (2006.01) |
| *B64D 33/02* | (2006.01) |
| *F02K 7/10* | (2006.01) |
| *H01M 8/0606* | (2016.01) |
| *B64D 33/04* | (2006.01) |
| *B64D 37/00* | (2006.01) |

(52) U.S. Cl.
CPC ............ *B64D 41/00* (2013.01); *B64D 27/16* (2013.01); *B64D 33/02* (2013.01); *B64D 33/04* (2013.01); *B64D 37/00* (2013.01); *F02K 7/10* (2013.01); *H01M 8/0606* (2013.01); *B64D 2033/026* (2013.01); *B64D 2033/0273* (2013.01); *B64D 2041/005* (2013.01); *F05D 2220/10* (2013.01); *H01M 2250/20* (2013.01)

(58) Field of Classification Search
CPC .. B64D 27/24; B64D 2041/005; B64D 33/02; B64D 33/04; B64D 37/00
See application file for complete search history.

(56) References Cited

U.S. PATENT DOCUMENTS

| | | | | |
|---|---|---|---|---|
| 2,850,873 | A | * | 9/1958 | Hausmann ................ F02K 7/10 73/147 |
| 3,340,690 | A | * | 9/1967 | Norman .................... F02K 7/10 60/265 |
| 3,811,280 | A | | 5/1974 | Wharton et al. |
| 5,129,227 | A | | 7/1992 | Klees et al. |
| 5,253,474 | A | | 10/1993 | Correa et al. |
| 5,282,359 | A | | 2/1994 | Chester |
| 5,660,040 | A | | 8/1997 | Henry et al. |
| 5,836,542 | A | | 11/1998 | Burns |
| 6,003,300 | A | | 12/1999 | Bates |
| 6,470,672 | B1 | | 10/2002 | Buggele et al. |
| 6,523,991 | B1 | | 2/2003 | Maklad |
| 6,834,831 | B2 | | 12/2004 | Daggett |
| 6,857,261 | B2 | | 2/2005 | Wilson et al. |
| 6,948,306 | B1 | | 9/2005 | Wilson et al. |
| 7,380,749 | B2 | | 6/2008 | Fucke et al. |
| 7,797,943 | B2 | | 9/2010 | Bulman |
| 7,966,830 | B2 | * | 6/2011 | Daggett ................. B64D 27/02 60/780 |

(Continued)

FOREIGN PATENT DOCUMENTS

WO WO2018154908 A1 8/2018

*Primary Examiner* — Alain Chau
(74) *Attorney, Agent, or Firm* — Dority & Manning, P.A.

(57) ABSTRACT

A ramjet including: a combustion area having an air inlet and an exhaust outlet; and a fuel cell in fluid communication with the air inlet and a fuel supply of the ramjet, wherein the fuel cell is in thermal communication with the combustion area.

18 Claims, 4 Drawing Sheets

(56) References Cited

U.S. PATENT DOCUMENTS

| | | | |
|---|---|---|---|
| 9,745,921 B2 | 8/2017 | Trefny et al. | |
| 9,897,041 B2 * | 2/2018 | Hoffjann | H01M 8/1018 |
| 10,724,432 B2 * | 7/2020 | Shapiro | H01M 8/2428 |
| 11,239,470 B2 * | 2/2022 | Hart | H01M 8/04089 |
| 2008/0001038 A1 * | 1/2008 | Daggett | B64D 27/02 |
| | | | 244/53 R |
| 2013/0200216 A1 * | 8/2013 | Mock | C01B 3/32 |
| | | | 222/3 |
| 2015/0308383 A1 * | 10/2015 | Hoffjann | B64D 27/24 |
| | | | 60/269 |
| 2015/0353201 A1 * | 12/2015 | Hagh | A62C 3/08 |
| | | | 244/135 R |
| 2017/0275028 A1 | 9/2017 | Janeke | |
| 2018/0141674 A1 * | 5/2018 | Bailey | B64D 41/00 |
| 2019/0136761 A1 * | 5/2019 | Shapiro | H01M 8/04201 |
| 2020/0194799 A1 * | 6/2020 | Hart | H01M 8/04089 |
| 2022/0111974 A1 * | 4/2022 | Wickersham | F02K 7/10 |
| 2022/0123323 A1 * | 4/2022 | Hart | H01M 8/04089 |

\* cited by examiner

AIRCRAFT ENGINES WITH A FUEL CELL

FIELD

The present subject matter relates generally to aircraft engines, and more particularly to aircraft engines including fuel cells.

BACKGROUND

Fuel cells are electrochemical energy conversion devices that provide a direct current (dc) voltage that can be used to power motors, lights, communication equipment and the like. Fuel cells produce electricity by electrochemically combining fuel and oxidant across an ionic conducting layer, also referred to as the electrolyte of the fuel cell, can be a liquid or a solid. Common types of fuel cells include phosphoric acid (PAFC), molten carbonate (MCFC), proton exchange membrane (PEMFC), and solid oxide (SOFC).

In general, fuel cells include the electrolyte and two electrodes. The reactions that produce electricity generally take place at the electrodes where a catalyst may be disposed to speed the reaction. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, fuel cells convert hydrogen (fuel) and oxygen (oxidant) into water (byproduct) to produce electricity. The byproduct can exit the fuel cell as steam in high-temperature operations. Where air is used as the oxidant, the nitrogen in the air is substantially inert and typically passes through the fuel cell. Exemplary hydrocarbon fuels include, but are not limited to, natural gas, methane, ethane, propane, methanol, and other hydrocarbons.

Ramjets are simple forms of supersonic airbreathing jet engines and typically lack moving parts. Air entering the ramjet is compressed subsonically and mixed with fuel which burns in a combustion chamber downstream of a flame holder. The exhaust gases pass through a choked nozzle and are exhausted into the atmosphere at supersonic speeds. Ramjets work most efficiently between speeds of Mach 2 (1,500 MPH) and Mach 4 (3,000 MPH). During operation, it is not uncommon for exit stagnation temperatures to reach the order of 3,800° F.

Supersonic combustion ramjets (scramjets) are ramjets in which combustion takes place in a supersonic airstream. Due to their design, scramjet operation is typically limited to near-hypersonic velocities (e.g., in excess of Mach 5, or 3,800 MPH).

Jet engines generate significant amounts of thermal energy which is currently being ignored or wasted. Accordingly, those of ordinary skill in the art continue to demand improved engine performance and energy usage.

BRIEF DESCRIPTION

Aspects and advantages of the invention will be set forth in part in the following description, or may be obvious from the description, or may be learned through practice of the invention.

In one exemplary aspect of the present disclosure, a ramjet comprising: a combustion area having an air inlet and an exhaust outlet; and a fuel cell in fluid communication with the air inlet and a fuel supply of the ramjet, wherein the fuel cell is in thermal communication with the combustion area.

In another exemplary aspect of the present disclosure, an aeronautical engine comprising a fuel cell disposed in fluid communication between a fuel supply and a combustion area of the aeronautical engine, wherein the fuel cell is configured to receive air intake from an air inlet of the aeronautical engine and generate electricity.

In another exemplary aspect of the present disclosure, A method of generating electricity on a ramjet, the method comprising: intaking air at an air inlet of the ramjet; supplying at least a portion of the intake air and fuel to a fuel cell of the ramjet; and generating, by the fuel cell, electricity.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
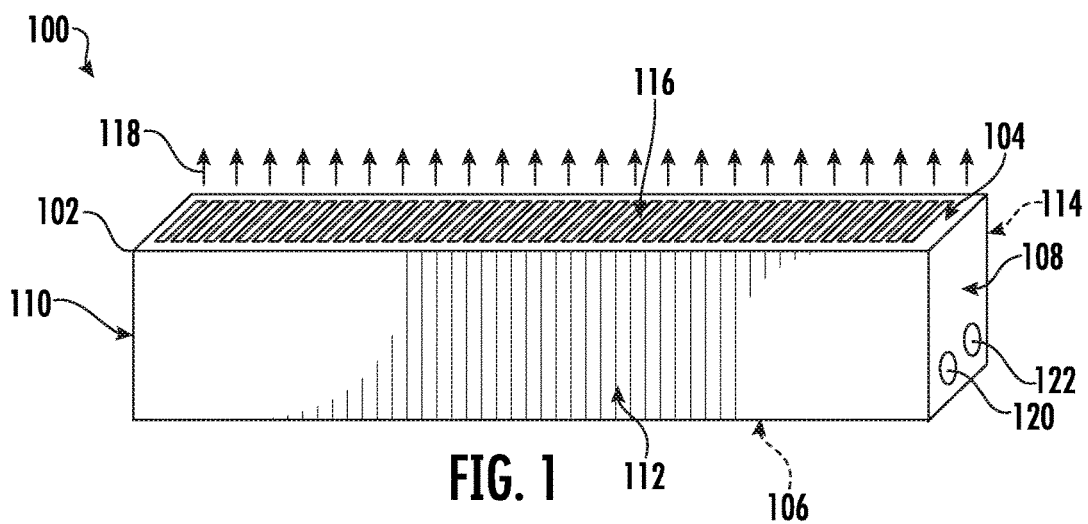
FIG. 1 is a perspective view of a fuel cell system in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, affixing, or attaching, as well as indirect coupling, affixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, an aircraft engine, such as a ramjet, can include a fuel cell configured to generate electricity in response to thermal energy dissipated by combustion within the aircraft engine. The fuel cell can be disposed in a bypass air channel of the aircraft engine and receive air from the surrounding environment through an air inlet. The air passing through the bypass air channel can be travelling at subsonic speeds while a main air channel of the aircraft engine operates at supersonic speeds. The air can pass through the fuel cell, along with fuel, and enter the combustion chamber where it can be ignited to create thrust which can propel the aircraft. The fuel cell can utilize the air and fuel in an ion exchange process to generate electricity. In certain embodiments, the fuel cell can utilize internally reformed fuel, thereby eliminating the requirement of externally reformed fuel or externally reheated air to operate, and reducing the number of subsystems required on the aircraft for fuel cell usage. The resulting aircraft can thereby have reduced weight and simplified engine complexity with increased thermal efficiency and decreased specific fuel consumption. In other embodiments, the fuel cell can utilize externally, or partially-externally, reformed fuel.

Referring now to the figures, FIG. 1 illustrates an embodiment of a fuel cell system 100. The system 100 includes an electrically grounded outer housing 102 having a combustion outlet side 104 and an opposite side 106, a fuel and air inlet side 108 and an opposite side 110, and opposite sides 112, 114. The sides 106, 114 are not visible in the perspective view of FIG. 1. The shape and design of the outer housing 102 may differ from what is shown in FIG. 1. For example, the outer housing 102 need not have a rectangular or cubic shape in another embodiment.

The outlet side 104 can include a plurality of outlets 116 through which air and fuel 118 can pass out of the housing 102. The air and fuel 118 can pass from the housing 102 and enter a combustion chamber of the ramjet, as described hereinafter.

The inlet side 108 can include one or more fuel inlets 120 and one or more air inlets 122. Optionally, one or more of the inlets 120 and 122 can be on another side of the outer housing 102. The fuel inlet 120 can be in fluid communication with a source of fuel, such as for example, a fuel supply on an aircraft containing the ramjet. The air inlet 122 can be in fluid communication with a source of air, such as for example, air entering the ramjet through an air inlet of the ramjet. The inlets 120 and 122 can separately receive the fuel and air from the external sources of fuel and air and separately direct the fuel and air into the fuel cells of the fuel cell system 100.

Figure 2:
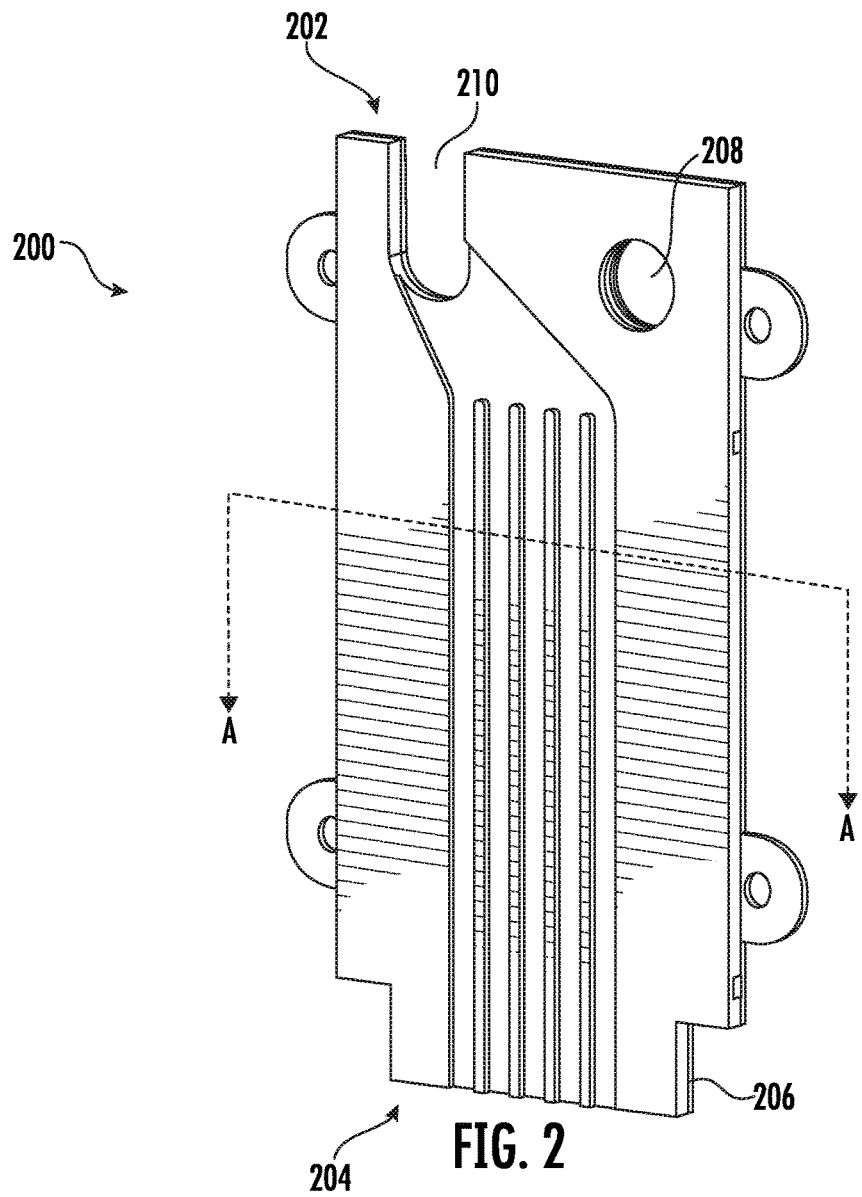
FIG. 2 is a perspective view of a fuel cell unit of a fuel cell system in accordance with an exemplary embodiment of the present disclosure.

FIG. 2 illustrates a perspective view of a fuel cell unit 200 in accordance with an exemplary embodiment. The fuel cell unit 200 represents part of one or more fuel cells that are included in the housing 102 shown in FIG. 1. The fuel cell unit 200 extends from an inlet end 202 to an opposite outlet end 204. In general, during operation fuel and air can flow from the inlet end 202 to the outlet end 204. The outlet end 204 can be located at, or be coextensive with, the outlet side 104 of the housing 102 shown in FIG. 1. For example, the outlets 116 shown in FIG. 1 may be the outlet ends 204 of a stack of a plurality of fuel cell units 200. The inlet end 202 may be located at or inside the side 106 of the housing 102.

Several fuel cell units 200 can be stacked together inside the housing 102. For example, a plurality of fuel cell units 200 can be placed into contact with each other so that catalyst sides 206 of the fuel cell units 200 face the inlet side 108 of the housing 102. The catalyst sides 206 can represent the sides of the fuel cell units 200 that have several catalyst layers in an active region 208 of the fuel cell unit 202. These layers can include an anode layer, a cathode layer, and an electrolyte layer (e.g., a solid oxide layer or a high temperature proton conducting layer) disposed between the anode layer and the cathode layer.

The fuel cell unit 200 can further include a fuel inlet 208 and an air inlet 210. The fuel inlet 208 can be aligned or otherwise in fluid communication with the fuel inlet 120 of the housing 102 and the air inlet 214 can be aligned or otherwise in fluid communication with the air inlet 122 of the housing 102. When the fuel cell units 200 are stacked together, the fuel inlets 208 can be aligned or otherwise in fluid communication with the fuel inlet 120 so that the fuel cell units 200 receive fuel injected into the housing 102 via the fuel inlet 120. The air inlets 210 can be aligned or otherwise in fluid communication with the air inlet 122 so that the fuel cell units 200 receive air into the housing 102 via the air inlet 122.

Figure 3:
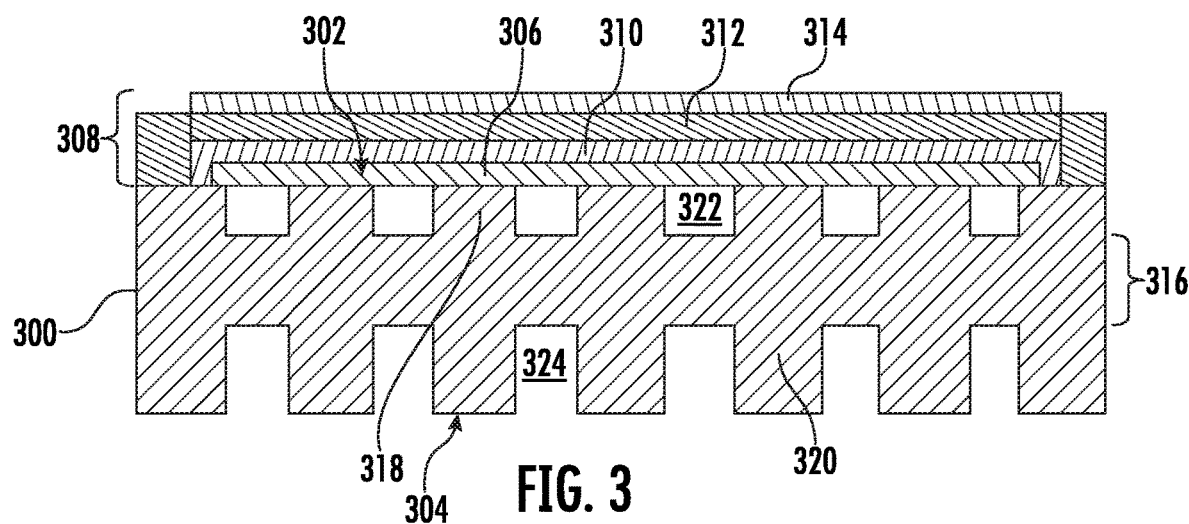
FIG. 3 is a cross-sectional side view of the fuel cell unit of FIG. 2 as seen along line A-A in FIG. 2 in accordance with an exemplary embodiment of the present disclosure.

FIG. 3 is a cross-sectional view of the fuel cell unit 200 of FIG. 2 as seen along line A-A. The fuel cell unit 200 includes a support structure 300, such as a metal support. The support structure 300 can extend from a catalyst support surface 302 to an opposite side or surface 304. A porous support layer 306 can be provided on the catalyst support surface 302 of the conductive support structure 300. The porous support layer 306 can be formed from one or more materials that form pores to allow fuel and air to flow through the porous support layer 306.

In the illustrated embodiment, a catalyst layer stack 308 is provided on and separated from the conductive support structure 300 by the porous support layer 306. The catalyst layer stack 308 includes an anode layer 310 deposited or otherwise formed on the porous support layer 306. The anode layer 310 can be formed from materials that operate as an anode of the fuel cell formed by a combination of two of the fuel cell units 200. The catalyst layer stack 308 also includes an electrolyte layer 312 deposited or otherwise formed on the anode layer 310. The electrolyte layer 312 is formed from materials that operate as the electrolyte of the fuel cell formed by a combination of two of the fuel cell units 200. The catalyst layer stack 308 also includes a cathode layer 314 deposited or otherwise formed on the electrolyte layer 312. The cathode layer 314 can be formed from materials that operate as the cathode of the fuel cell formed by a combination of two of the fuel cell units 200. Alternatively, the cathode layer 314 may be on and in contact with the porous layer 306 instead of the anode layer 310 with the anode layer 310 in the location of the cathode layer 314 shown in FIG. 3. The two-dimensional region or footprint of the layers 310, 312, and 314 that overlap each other can define an active region of the fuel cell unit 200.

In the cross-sectional plane of the illustrated embodiment, the support structure 300 is formed as a combed body that includes a solid plate 316 with protrusions 318 and 320 extending away from the solid plate 316 in opposite directions (e.g., toward the catalyst side of the fuel cell unit 200 and toward the opposite open side 304 of the fuel cell unit 200). The protrusions 318 and 320 can be elongated in directions extending into and out of the plane of FIG. 3, or toward the inlet and outlet ends of the fuel cell unit 200. These protrusions and the plate 316 form elongated channels or passages 322 and 324.

In each fuel cell unit 200, the passages 322 on one side of the plate 316 can be fuel passages through which fuel flows through the fuel cell unit 200 and the passages 324 on the opposite side of the plate 316 can be air passages through which air flows through the fuel cell unit 200. Alternatively, if the cathode layer 314 is in contact with the porous layer 306 and the anode layer 310 is on the opposite side of the electrolyte layer 312, then the passages 322 may be the air passages and the passages 324 can be the fuel passages.

The passages 322 are each bounded, or enclosed, by the porous layer 306, two of the protrusions 318, and the plate 316. These passages 322 can be referred to as closed passages. In contrast, the passages 324 can be referred to as open passages as these passages 324 are bounded on three sides by the plate 316 and the protrusions 320 but are open along the open side 304 of the conductive support structure 300.

Figure 4:
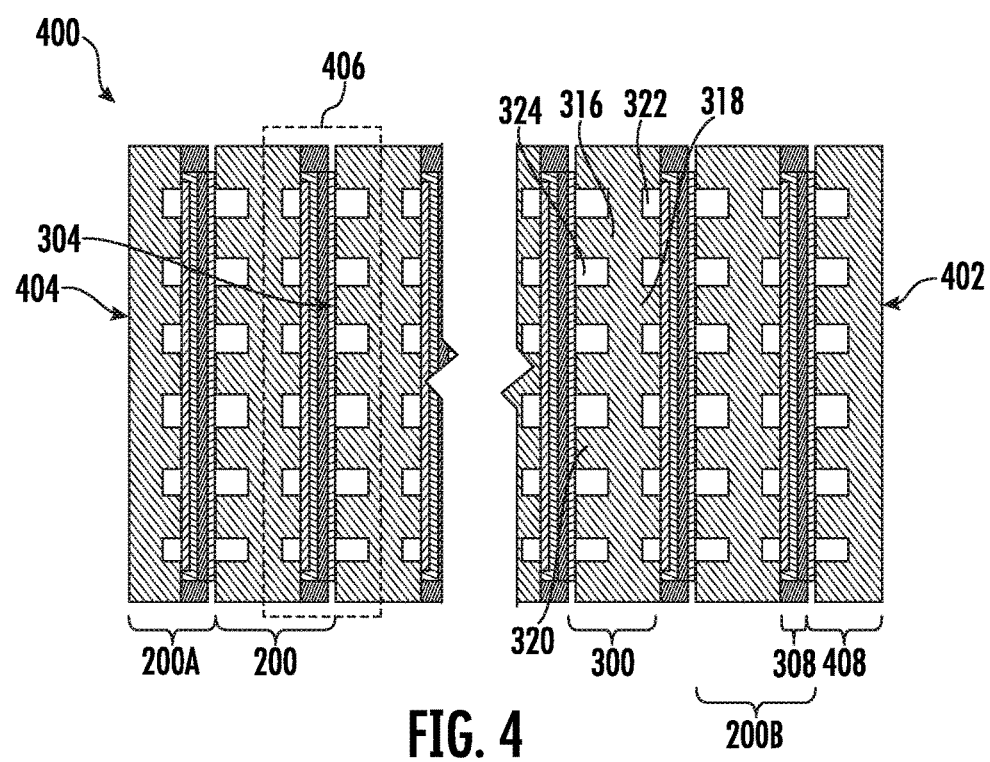
FIG. 4 is a schematic side view of a stack of fuel cell units in accordance with an exemplary embodiment of the present disclosure.

FIG. 4 illustrates an embodiment of a cross-sectional view of a stack 400 of several fuel cell units 200 shown in FIG. 2. The number of fuel cell units 200 in the stack 400 is provided as one example. A greater or lesser number of fuel cell units 200 may be included in the stack 400. The stack 400 is shown in cross-sectional view through a plane that is the same plane as shown in FIG. 3 for the individual fuel cell unit 200. The stack 400 extends from an inlet end 402 to an opposite end 404. The inlet end 402 may be at or inside the inlet side 108 of the housing 102 shown in FIG. 1. The opposite end 404 may be at or inside the opposite side 110 of the housing 102.

The fuel cell units 200 can be placed into contact with each other so that several of the fuel cell units 200 have the open side 304 of the conductive support structure 300 in contact with the catalyst layer stack 308 of another fuel cell unit 200. This can enclose the passages 324 between the plate 316 of one fuel cell unit 200, two protrusions 320 of the same fuel cell unit 200, and the catalyst layer stack 308 of another fuel cell unit 200, as shown in FIG. 4. This manner of stacking the fuel cell units 200 forms several fuel cells 406, with each of these fuel cells 406 formed from part, but not all, of two fuel cell units 200. An end fuel cell unit 200 (e.g., the fuel cell unit 200A in FIG. 4) may not have the protrusions 320 or passages 324 on one side of the plate 316 of that fuel cell unit 200A. Another end fuel cell unit 200 (e.g., the fuel cell unit 200B in FIG. 4) may be connected with an end cap support structure 408. The end cap support structure 408 may be part of a conductive support structure 300 that includes the plate 316 and protrusions 320 (and corresponding channels 324), but not the protrusions 318 (or corresponding channels 322).

Stacking the fuel cell units 200 against each other forms the several fuel cells 406, as shown in FIG. 4. The number of fuel cells 406 in each stack 400 can be increased by including more fuel cell units 200 in the stack 400. Within each fuel cell 406, fuel flows on one side of the catalyst layer stack 308 in the passages 322 of one fuel cell unit 200 while air flows on the other side of the same catalyst layer stack 308 in the passages 324 of another fuel cell unit 200. At least some of the fuel can pass through the porous support layer 306 to reach the anode layer 310 and the air can contact the cathode layer 314 so that the fuel cell 406 can generate electric current. Alternatively, air can flow on one side of the catalyst layer stack 308 in the passages 322 of one fuel cell unit 200 in a fuel cell 406 while fuel flows on the other side of the same catalyst layer stack 308 in the passages 324 of another fuel cell unit 200. At least some of the air can pass through the porous support layer 306 to reach the cathode layer that is on the porous support layer 306 and the fuel can contact the anode layer on the opposite side of the catalyst layer stack 308 so that the fuel cell 406 can generate electric current.

The fuel cells 404 can be connected in series with each other so that the electric current generated in the fuel cells 404 is additively combined. The current generated by each fuel cell 404 can be conducted through the conductive support structure 300 to a conductive body (e.g., a bus, wires, or the like) that is connected with several fuel cells 404. Alternatively, two or more of the fuel cells 404 may be connected in parallel with each other. This electric current can be conducted out of the stack 400 and out of the housing 102 shown in FIG. 1 by one or more conductive bodies, such as one or more buses, wires, cables, or the like.

In an embodiment, a plurality of fuel cell stacks 400 can be used together. The plurality of fuel cell stacks 400 can be separated by insulating spacers, such as ceramic spacers, which can prevent high voltage arcing between stacks 400, 400. Spacers can additionally be used to isolate the stacks 400 from nearby metal, such as the steel to which they are mounted to.

Fuel cells described herein can consume some fuel and air to generate electric current. The unused fuel (or fuel that is not consumed by the fuel cell) can be directed out of the fuel cell where the unused fuel can be combusted. This combusted fuel can be used for other purposes or to perform other work, such as propelling an aircraft. The electric current generated by the fuel cell can be used to power one or more components of the aircraft.

Each of the fuel cells can have a metal support that provides conduction of electric current between the fuel cells in the same stack. This support can be referred to as a conductive support structure. The fuel cells can be solid oxide fuel cells (SOFC) or another type of fuel cell. The metal supports can include inner channels or can form these inner channels by placing multiple fuel cells side-by-side. These channels provide for the flow of air and fuel over electrodes of the fuel cells for the generation of electric current. The fuel cells can include porous supports at an interface between the electrodes and the metal support. The porous supports can be referred to as electrode supports.

The electrodes of the fuel cells can be deposited on this porous support, such as by depositing the anode on the porous support, an electrolyte on the anode, and a cathode on the electrolyte. The porous support may have pores that are large enough to allow fuel (e.g., gaseous fuel) flowing in the inner channels to diffuse through the porous support to the electrodes. But, the pores may be small enough to stop passage of particles forming the electrodes from passing through the porous support. In one embodiment, the pores in the porous support can range in size from two micrometers to eighty micrometers, but alternatively, may be smaller or larger depending on the size of the particles that are deposited to form the electrodes. The layers of material forming the electrodes can be deposited using thermal spraying or another deposition technique.

The conductive support structure and electrode support in a fuel cell can be formed from one or more corrosion resistant metals to slow degradation of the fuel cell (relative to using non-corrosion resistant metals). Examples of the metals that can be used include E-BRITE, stainless steel of the SS430 series (e.g., SS430, SS431, etc.), Jethete M152™, CROFER 22 APU, and HAYNES alloys, nickel and nickel chromium alloys, or the like. The metal may have a large chrome content (e.g., higher than ~8-10% by weight of the metal support or the porous support) to impart greater conductivity to the supports.

In one embodiment, thin protective coatings may be provided on the conductive support structure on the cathode or anode side of the fuel cell (e.g., a coating that is thinner than the cathode or anode) increase the conductivity of the oxide scale or prevent chromium evaporation and poisoning of the electrodes (e.g., the cathode). The protective coatings can be formed from materials such as cobalt, manganese, a combination of cobalt and manganese, electron-conducting ceramics, and the like.

The conductive support structure can provide inlet manifolds and gas flow fields for the electrodes of the fuel cell. Where other fuel cell systems collect the gases in exhaust manifolds and direct the gases to another fuel cell system component, the systems described herein direct the exhaust of the fuel cell flow fields into a combustion chamber and allowed to react (e.g., combust) just after leaving the fuel cell. The fuel cell includes a series of exhaust holes for fuel and air to allow for efficient combustion. The electrodes in each fuel cell can be terminated before the fuel and air exhaust locations (e.g., terminated along the direction in which the fuel and air flow in the fuel cell). For example, the electrodes may not come within one hundred micrometers to ten millimeters of the area where the fuel mixes with the air for combustion (e.g., the combustion chamber). This area where the electrodes do not extend into can be referred to as a termination region.

In the termination region, the composition of the conductive support structure may be varied relative to other regions of the conductive support structure to a more corrosion resistant alloy and/or can be coated with one or more thermal barrier coatings. These thermal barrier coatings can be formed from the same material as the electrolyte material of the fuel cell or may be an extension of the electrolyte coating or layer into the termination region (without the cathode and anode also extending into the termination region). This can help protect the termination region of the fuel cell stack from excessive corrosion.

The metal support can include elongated flow channels that separately direct the flow of air and fuel (e.g., gas) in one direction and cross-over ports that direct part of the air or fuel in a transverse direction. The metal supports of the fuel cells described herein can allow for fuel cells (such as SOFC) to be used to both generate electric current and generate combustion that may be used for propulsion. Other fuel cells may have ceramic components or supports, which can be too fragile to withstand combustions. Additionally, the metal supports of the fuel cells described herein may have coefficients of thermal expansion that are closer to the coefficients of thermal expansion of the materials used to create the electrodes and electrolytes that the heat generated (and conducted through the fuel cell) from the combustions does not create damaging levels of thermal stress. Moreover, the surfaces of the metal supports can be made rough by the porous supports to improve adhesion of the electrode layers to the metal supports.

Integrating fuel cells such as SOFC into a combustion system as a topping cycle operating at high pressure and low utilization can allow the fuel cells to produce high efficiency power at high power density (e.g., power densities greater than half a watt per square centimeter or power densities of at least three and up to ten watts per square centimeter). By integrating the fuel cells and fuel cell stacks directly into the combustion systems, many redundant heat exchangers and control systems for fuel and air management are integrated for an overall lower cost of power production. Additionally, for propulsion systems, the efficiency of the propulsion systems can be substantially increased by more than 100% due to the fuel cells producing electric power directly from the air and fuel that also is combusted to generate propulsion. For aircraft, this combination of electric current and propulsion can be used to increase flight ranges. For example, an aircraft can be at least partially propelled by thrust generated by the combustion from the fuel cells and the electric current generated by the fuel cells can be used to power an additional rim motor of the aircraft. For unmanned aircraft (e.g., drones), the integrated fuel cell and combustion system can provide an estimated double in fuel consumption efficiency, thereby increasing flight range by up to 40%. Optionally, the electric current that is generated can be used to power electronics onboard aircraft (e.g., other than those that generate thrust).

Figure 5:
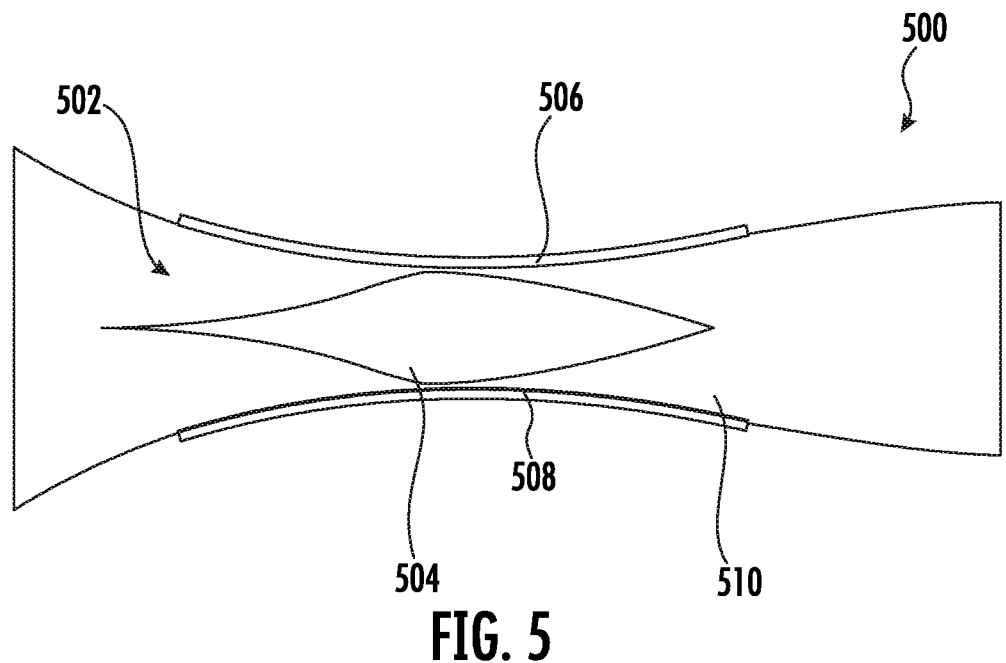
FIG. 5 is a schematic, cross-sectional view of a ramjet in accordance with an exemplary embodiment of the present disclosure.

FIG. 5 illustrates a schematic, cross-sectional view of an exemplary aircraft engine in accordance with an embodiment described herein. The particular aircraft engine depicted in FIG. 5 is a ramjet 500, however, it should be understood that other aircraft engines may be suitable for use with the fuel cell described herein. The ramjet 500 can generally include an air inlet 502 which receives air from a surrounding environment and an inlet body 504 configured to increase the relative pressure of the air passing through the air inlet 502. As the ramjet 500 advances through the environment, the pressure of the air within the ramjet 500 increases. Upon reaching a combustion area 506, the air is mixed with fuel supplied through one or more fuel injection ports 508. The combination of fuel and air at high pressure is ignited and exhausts from the ramjet 500 through a nozzle 510, such as a choked nozzle, under high pressure. The high-pressured exhaust gas generates thrust which propels the ramjet 500, and the attached aircraft, through the environment.

Figure 6:
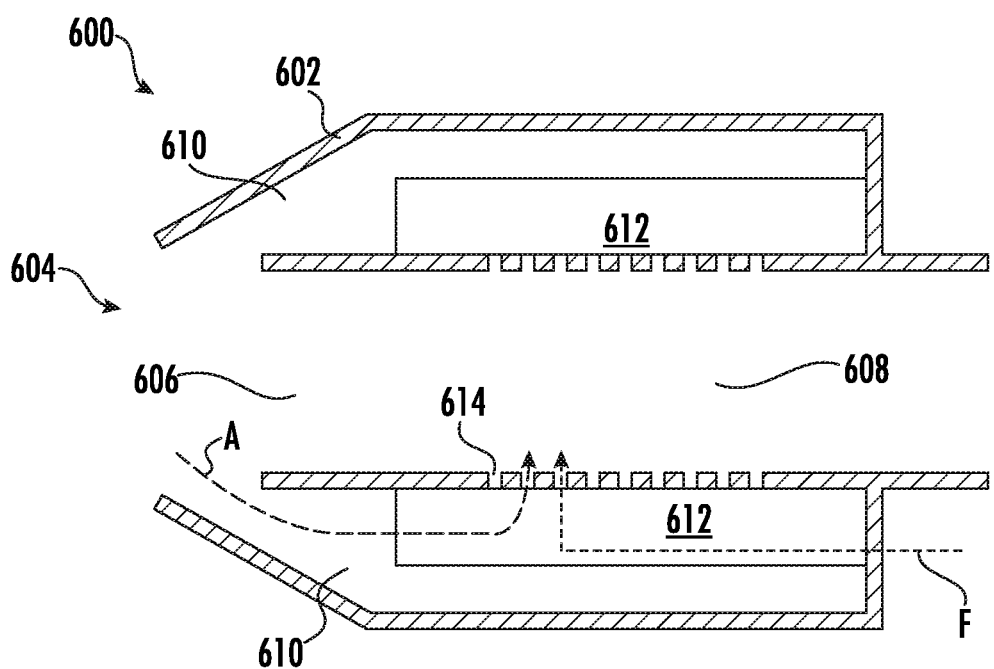
FIG. 6 is a schematic, cross-sectional view of a portion of a ramjet in accordance with an exemplary embodiment of the present disclosure.

FIG. 6 illustrates a schematic, cross-sectional view of a portion of a ramjet 600 including a body 602 having an air inlet 604 which receives incoming air from the surrounding environment and directs a first portion of the received air through a main air channel 606 in fluid communication with a combustion area 608. A second portion of the received air can be routed through the air inlet 604 to a bypass air channel 610 in fluid communication with a fuel cell 612, such as the aforementioned fuel cell (e.g., fuel cell stack 400). The bypass air channel 610 can be in fluid communication with the main air channel 606 upstream of the combustion area 608. The second portion of air entering the air inlet 604 can travel along line A through the bypass air channel 610 to the fuel cell 612. The second portion of air can interface with the fuel cell 612 (e.g., through air passages 322) and enter the combustion area 608 where it can be ignited to generate thrust.

A volumetric flow rate of the first and second portions of air travelling through the ramjet 600 can be equal to, or approximately equal to, the total volumetric flow rate of air entering the air inlet 604.

In an embodiment, a volumetric flow ratio [$A_M:A_B$] of received air entering the main air channel 606, $Q_M$, to received air entering the bypass air channel 610, $Q_B$, can be in a range between 10,000:1 and 1:100, such as in a range between 100:1 and 1:10. In an embodiment, $Q_M$ is greater than $Q_B$. In a more particular embodiment, $Q_M$ is significantly greater than $Q_B$. That is, the volumetric flow rate of air entering the main air channel 606 can exceed the volumetric flow rate of air entering the bypass air channel 610.

In an embodiment, the first portion of air passing through the main air channel 606 can travel at an average first speed while second portion of air passing through the bypass air channel 610 can travel at an average second speed less than the average first speed. For example, the first portion of air passing through the main channel 606 can travel at supersonic speeds while second portion of air passing through the bypass air channel 610 can travel at subsonic speeds. In such a manner, the air interfacing with the fuel cell 612 can be travelling at subsonic speeds while air passing through the main air channel 606 can be travelling at supersonic speeds thus allowing the ramjet 600 to operate at supersonic speeds with increased efficiency.

In an embodiment, the fuel cell 612 can be disposed adjacent to, such as immediately adjacent to, the combustion area 608. The ramjet 600 depicted in FIG. 6 shows the fuel cell 612 as contacting an outer surface of the combustion area 608. However, direct contact between the fuel cell 612 and outer surface of the combustion area 608 may not be required.

As described above with respect to FIG. 3, the support structure 300 of fuel cell unit 200 can include air passages 322 which extend along the fuel cell unit 200. The second portion of air passing through the bypass air channel 610, or a portion thereof, can interface with the fuel cell 612 at the air passages 322. More particularly, the second portion of air can enter the air passages 322 of the fuel cell unit 200 and interface therewith to create electricity under certain operating conditions. One of those operating conditions can include temperature. More specifically, the fuel cell 612 may only generate electricity upon reaching an activation temperature at which ion exchange occurs.

The fuel cell 612 can be in thermal communication with the combustion area 608 such that the fuel cell 612 receives thermal energy (heat) generated by the ignition of the fuel F and air within the combustion area 608 to generate electricity. In certain instances, the fuel cell 612 can have an activation temperature, or the temperature required to commence electricity generation, of at least 900° F., such as at least 950° F., such as at least 1000° F., such as at least 1100° F., such as at least 1200° F., such as at least 1300° F., such as at least 1400° F., such as at least 1500° F. In an embodiment, the activation temperature of the fuel cell 612 can be no greater than 2000° F., such as no greater than 1800° F. At the activation temperature, or within a range of activation temperatures, ions within the fuel cell 612 can react with the fuel F to produce electricity. More particularly, as the fuel F crosses the anode of the fuel cell 612, it attracts oxygen ions from the cathode of the fuel cell 612. The oxygen ions can react with the fuel F to produce electricity, steam, and carbon dioxide. The steam and/or carbon dioxide generated during electrical energy production can be recycled through the ramjet 600 or vented into the environment. The resulting electricity can be used to power one or more batteries or equipment of the aircraft to which the ramjet 600 is attached, reducing electrical storage requirements of the batteries of the aircraft.

After interfacing with the fuel cell 612, the second portion of air can pass through one or more openings 614 in the side of the combustion area 608, or another related port, and enter the combustion area 608 where it can be ignited with fuel F. By way of example, the one or more openings 614 can include at least one opening, such as at least two openings, such as at least three openings, such as at least five openings, such as at least twenty openings, such as at least one hundred openings, such as at least five hundred openings. In certain instances, the one or more openings 614 can be arranged in a grid-like configuration or otherwise include a plurality of equally spaced apart, or non-equally spaced, openings. In an embodiment, the second portion of air can pass directly from the fuel cell 612 to the combustion area 608 through the one or more openings 614. That is, the fuel cell 612 and combustion area 608 can be in direct fluid communication with one another through the one or more openings 614. In another embodiment, the second portion of air can pass through an intermediary subsystem or component between the fuel cell 612 and the combustion area 608. For example, the second portion of air may pass through piping, one or more subsystems or components of the ramjet 600, or the like, prior to entering the combustion area 608.

At least a portion of the fuel F being injected into the combustion area 608 can interface with the fuel cell 612 prior to entering the combustion area 608. For example, the fuel F can pass through the aforementioned fuel passages 324 (FIG. 3) of the fuel cell 612. In an embodiment, the portion of fuel F passing through the fuel cell 612 can pass directly from the fuel cell 612 to the combustion area 608. In another embodiment, the portion of the fuel F can pass through an intermediary subsystem or component between the fuel cell 612 and the combustion area 608.

In some instances, less than 100% of the fuel injected into the combustion area 608 passes through the fuel cell 612. For example, less than 99% of the fuel F entering the combustion area 608 can pass through the fuel cell 612, such as less than 98% of the fuel F, such as less than 97% of the fuel F, such as less than 96% of the fuel F, such as less than 95% of the fuel F, such as less than 90% of the fuel F. In other instances, all of the fuel F injected into the combustion area 608 can pass through the fuel cell 612. The fuel F, or the portion thereof passing through the fuel cell 612, can pass through the one or more openings 614 along the wall of the combustion area 608 and be ignited in the combustion area 608 to generate thrust. In certain instances, the one or more openings 614 can be common to both the second portion of air and the fuel F. In other instances, the fuel F and second portion of air can pass through separate openings to enter the combustion area 608.

In an embodiment, the fuel F and air can enter the fuel cell 612 in parallel with one another. That is, a mixture of fuel F and air can be approximately evenly distributed along the one or more openings 614 into the combustion area 608.

In certain instances, use of the fuel cell 612 within the ramjet 600 does not require externally reformed fuel or externally reheated air to operate. This might typically include utilizing unique anode catalysts for direct internal fuel reforming and/or open loop cathode designs to minimize system complexity and pressure drop by allowing the high temperature from the combustion area 608 and/or bypass air to pass directly through the fuel cell into the combustion area. In an embodiment, one or more protective coatings may be added at the surface of the anode to enable stable operation with internally reformed fuels. By way of non-limiting example, the fuel cell 612 may include a coating such as a reformer catalyst disposed in the channels of the fuel cell 612. Use of such coating(s) may allow for internal reforming of high octane jet fuels. In an embodiment, catalytic partial oxidation (CPDX) can be used. CPDX can rapidly reform kinetics with quick light-off characteristics and response to transients. Use of internally reformed fuel may reduce the number of subsystems required to reform or reheat the fuel and air, respectively, thereby reducing weight of the aircraft and engine complexity while increasing thermal efficiency of the ramjet 600 and decreasing specific fuel consumption. Moreover, the compact nature of the fuel cell 612 maximizes fuel cell durability by keeping the overall length of the fuel cell 612 small, which minimizes thermal and mechanical stresses across the fuel cell stack 400. In other embodiments, the fuel cell 612 can operate using externally, or at least partially-externally, reformed fuel, such as fuel passing through one or more intermediary subsystems or components configured to at least partially reform the fuel.

Figure 7:
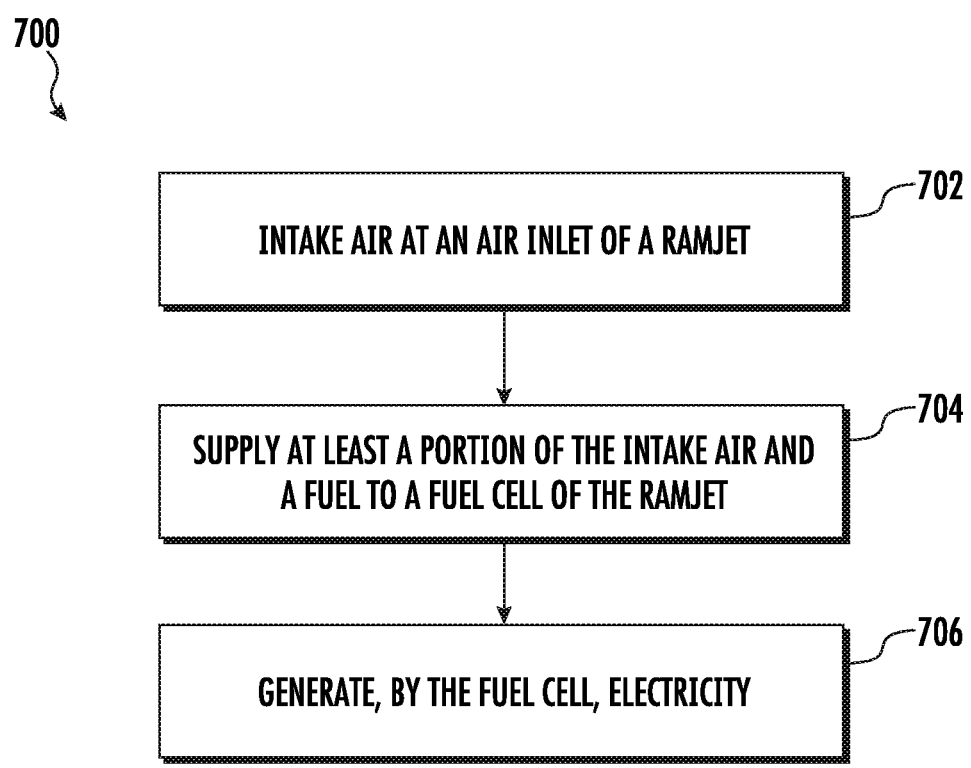
FIG. 7 is a flow chart of a method of using a fuel cell to generate electricity in an aircraft in accordance with an exemplary embodiment of the present disclosure.

FIG. 7 is an illustrative example of a method 700 of generating an electricity using a ramjet. The method 700 includes a step 702 of intaking air at an air inlet of the ramjet. The method 702 further includes a step 704 of supplying at least a portion of the intake air and fuel to a fuel cell of the ramjet. This can be performed, for example, by splitting the air into two or more portions, including a first portion which enters a combustion area of the ramjet and a second portion which enters a bypass air channel and interfaces with the fuel cell. In an embodiment, splitting of the intake air can be performed by an edge, or guide, of the ramjet. As previously described, the first and second portions of air may be travelling at different relative speeds as compared to one another. More particularly, the first portion of air can be travelling at higher speeds as compared to the second portion of air. The second portion of air can pass through the fuel cell, along with fuel F, and into the combustion area.

The method 700 can further include a step 706 of generating electricity using the fuel cell. In an embodiment, the step 706 of generating electricity may only occur when the fuel cell is at, or above, the activation temperature of the fuel cell. While the activation temperature may vary based on one or more conditions, e.g., fuel cell composition, fuel type, and the like, it is noted that electricity generation may not occur, or may be significantly reduced, at temperatures below the activation temperature.

It should be understood that in other embodiments, the fuel cell described herein may be utilized in a scramjet or other types of aeronautical engines. Moreover, the fuel cell can be utilized in concert with one or more electrical components not explicitly described herein to use or store electrical energy generated by the fuel cell during operation. For instance, the fuel cell can be in electrical communication with one or more batteries, avionics, and the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A ramjet including a combustion area having an air inlet and an exhaust outlet; and a fuel cell in fluid communication with the air inlet and a fuel supply of the ramjet, wherein the fuel cell is in thermal communication with the combustion area.

The ramjet of one or more of these clauses, wherein the fuel cell comprises: one or more air passageways configured to route at least a portion of air from the air inlet to the combustion area; and one or more fuel passageways configured to route at least a portion of the fuel supply to the combustion area.

The ramjet of one or more of these clauses, wherein the air passageways and the fuel passageways are spaced apart from one another by a support structure of the fuel cell, the support structure comprising a body including a plurality of first projections on a first side of the body defining the air passageways and a plurality of second projections on a second side of the body opposite the first side, the plurality of second projections defining the fuel passageways.

The ramjet of one or more of these clauses, wherein the air and fuel passageways are in direct communication with the combustion area.

The ramjet of one or more of these clauses, wherein the fuel cell is disposed in fluid communication between the fuel supply and the combustion area, and wherein all fuel entering the combustion area passes through the fuel cell.

The ramjet of one or more of these clauses, wherein the fuel cell comprises a fuel cell having an activation temperature of at least 900° F.

The ramjet of one or more of these clauses, wherein the air inlet comprises: a main air channel in fluid communication with the combustion area; and a bypass air channel in fluid communication with the fuel cell.

The ramjet of one or more of these clauses, wherein the main air channel is configured to receive air travelling at a supersonic speed while the bypass air channel is configured to receive air traveling at a subsonic speed.

The ramjet of one or more of these clauses, wherein the fuel cell comprises a fuel cell stack including a plurality of stacked fuel cell units.

An aeronautical engine comprising: a fuel cell disposed in fluid communication between a fuel supply and a combustion area of the aeronautical engine, wherein the fuel cell is configured to receive air intake from an air inlet of the aeronautical engine and generate electricity.

The aeronautical engine of one or more of these clauses, wherein the fuel cell comprises a plurality of fuel cell units, and wherein at least one of the fuel cell units comprises: one or more air passageways configured to route at least a portion of air from the air inlet directly to the combustion area; and one or more fuel passageways configured to route at least a portion of the fuel supply to the combustion area.

The aeronautical engine of one or more of these clauses, wherein the fuel cell is a solid oxide fuel cell, and wherein an activation temperature of the solid oxide fuel cell is achieved through thermal transfer of heat from the combustion area.

The aeronautical engine of one or more of these clauses, wherein the air inlet comprises: a main air channel in fluid communication with the combustion area; and a bypass air channel in fluid communication with the fuel cell.

A method of generating electricity on a ramjet, the method comprising: intaking air at an air inlet of the ramjet; supplying at least a portion of the intake air and fuel to a fuel cell of the ramjet; and generating, by the fuel cell, electricity.

The method of one or more of these clauses, further comprising: splitting the intake air into a first portion and a second portion; and routing the first portion of intake air directly to the combustion area and the second portion of intake air through a bypass air channel to the fuel cell.

The method of one or more of these clauses, wherein the first portion of intake air is travelling at an average first speed, and wherein the second portion of intake air is travelling at an average second speed, as measured at the fuel cell, less than the average first speed.

The method of one or more of these clauses, wherein the first speed is a supersonic speed and the second speed is a subsonic speed.

The method of one or more of these clauses, wherein the second portion of air passes through the fuel cell directly into the combustion area.

The method of one or more of these clauses, wherein generating electricity occurs when the fuel cell is at an activation temperature of at least 900° F., and wherein heat supplied to the fuel cell is provided by the intake air, the combustion area, or both.

The method of one or more of these clauses, wherein supplying the intake air and fuel to the fuel cell comprises: passing the intake air through a plurality of air passageways; and passing the fuel through a plurality of fuel passageways, wherein the air and fuel passageways are spaced apart from one another by a support structure of the fuel cell, the support structure comprising a body including a plurality of first projections on a first side of the body defining the air passageways and a plurality of second projections on a second side of the body opposite the first side, the plurality of second projections defining the fuel passageways.

The method of one or more of these clauses utilizing a ramjet of one or more of these clauses.

The ramjet of one or more of these clauses utilizing the method of one or more of these clauses.

What is claimed is:

1. A ramjet comprising:
   a combustion area having an air inlet and an exhaust outlet, wherein the air inlet comprises a main air channel in fluid communication with the combustion area, and a bypass air channel in fluid communication with a fuel cell; and
   wherein the fuel cell is in fluid communication with the air inlet and a fuel supply of the ramjet, wherein the fuel cell is in thermal communication with the combustion area;
   wherein the main air channel is configured to receive air travelling at a supersonic speed during an operating condition of the ramjet and wherein the bypass air channel is configured to receive air traveling at a subsonic speed during the operating condition of the ramjet.

2. The ramjet of claim 1, wherein the fuel cell comprises:
   one or more air passageways configured to route at least a portion of air from the air inlet to the combustion area; and
   one or more fuel passageways configured to route at least a portion of the fuel supply to the combustion area.

3. The ramjet of claim 2, wherein the air passageways and the fuel passageways are spaced apart from one another by a support structure of the fuel cell, the support structure comprising a body including a plurality of first projections on a first side of the body defining the air passageways and a plurality of second projections on a second side of the body opposite the first side, the plurality of second projections defining the fuel passageways.

4. The ramjet of claim 2, wherein the air and fuel passageways are in direct communication with the combustion area.

5. The ramjet of claim 1, wherein the fuel cell is disposed in fluid communication between the fuel supply and the combustion area, and wherein all fuel entering the combustion area passes through the fuel cell.

6. The ramjet of claim 1, wherein the fuel cell comprises a fuel cell having an activation temperature of at least 900° F.

7. The ramjet of claim 1, wherein the fuel cell comprises a fuel cell stack including a plurality of stacked fuel cell units.

8. The ramjet of claim 1, wherein the bypass air channel expands to reduce an airflow speed of the airflow provided to the fuel cell from the air inlet.

9. An aeronautical engine comprising:
   a combustion area having an air inlet and an exhaust outlet, wherein the air inlet comprises a main air channel in fluid communication with the combustion area, and a bypass air channel in fluid communication with a fuel cell;
   wherein the fuel cell is disposed in fluid communication between a fuel supply and the combustion area of the aeronautical engine, wherein the fuel cell is configured to receive air intake from the air inlet of the aeronautical engine and generate electricity;
   wherein the main air channel is configured to receive air travelling at a supersonic speed during an operating condition of the aeronautical engine and wherein the bypass air channel is configured to receive air traveling at a subsonic speed during the operating condition of the aeronautical engine.

10. The aeronautical engine of claim 9, wherein the fuel cell comprises a plurality of fuel cell units, and wherein at least one of the fuel cell units comprises:
    one or more air passageways configured to route at least a portion of air from the air inlet directly to the combustion area; and
    one or more fuel passageways configured to route at least a portion of the fuel supply to the combustion area.

11. The aeronautical engine of claim 9, wherein the fuel cell is a solid oxide fuel cell, and wherein an activation temperature of the solid oxide fuel cell is achieved through thermal transfer of heat from the combustion area.

12. The aeronautical engine of claim 9, wherein the bypass air channel expands to reduce an airflow speed of the airflow provided to the fuel cell from the air inlet.

13. A method of generating electricity on a ramjet, the method comprising:

intaking air at an air inlet of the ramjet, wherein the ramjet comprises a combustion area having an air inlet and an exhaust outlet, wherein the air inlet comprises a main air channel in fluid communication with the combustion area, and a bypass air channel in fluid communication with a fuel cell;

supplying at least a portion of the intake air to the combustion area through the main air channel at a supersonic speed during an operating condition of the ramjet;

supplying at least a portion of the intake air and fuel to the fuel cell of the ramjet, wherein supplying at least the portion of the intake air and fuel to the fuel cell comprises supplying at least the portion of the intake air to the fuel cell through the bypass air channel at a subsonic speed during the operating condition of the ramjet; and generating, by the fuel cell, electricity.

14. The method of claim 13, further comprising:

splitting the intake air into a first portion received by the main air channel and a second portion received by the bypass air channel; and routing the first portion of intake air directly to the combustion area and the second portion of intake air through the bypass air channel to the fuel cell.

15. The method of claim 14, wherein the second portion of air passes through the fuel cell directly into the combustion area.

16. The method of claim 13, wherein generating electricity occurs when the fuel cell is at an activation temperature of at least 900° F., and wherein heat supplied to the fuel cell is provided by the intake air, the combustion area, or both.

17. The method of claim 13, wherein supplying the intake air and fuel to the fuel cell comprises:

passing the intake air through a plurality of air passageways; and passing the fuel through a plurality of fuel passageways, wherein the air and fuel passageways are spaced apart from one another by a support structure of the fuel cell, the support structure comprising a body including a plurality of first projections on a first side of the body defining the air passageways and a plurality of second projections on a second side of the body opposite the first side, the plurality of second projections defining the fuel passageways.

18. The method of claim 13, wherein the bypass air channel expands to reduce an airflow speed of the airflow provided to the fuel cell from the air inlet.

* * * * *